United States Patent [19]
Wang et al.

[11] Patent Number: 5,661,476
[45] Date of Patent: Aug. 26, 1997

[54] KEYBOARD FOR PERSONAL INFORMATION DEVICE

[75] Inventors: Weijia Wang, Sunnyvale; Chuan David Ai; Michael M. Y. Tsai, both of Palo Alto, all of Calif.

[73] Assignee: General Wireless Communications, Inc., Santa Clara, Calif.

[21] Appl. No.: 606,360

[22] Filed: Feb. 23, 1996

[51] Int. Cl.[6] ............................................. H03K 17/94
[52] U.S. Cl. ....................... 341/22; 341/23; 341/28; 345/169; 364/709.16
[58] Field of Search ........................ 341/20, 21, 22, 341/23, 26, 28; 345/168, 169, 171, 172; 364/709.01, 709.11, 709.12, 709.16

[56] References Cited

U.S. PATENT DOCUMENTS

| | | | |
|---|---|---|---|
| 4,763,252 | 8/1988 | Rose | 341/23 |
| 5,281,966 | 1/1994 | Walsh | 341/22 |
| 5,408,621 | 4/1995 | Ben-Arie | 400/489 |
| 5,473,325 | 12/1995 | McAlindon | 341/20 |

*Primary Examiner*—Jeffery Hofsass
*Assistant Examiner*—Andrew Hill
*Attorney, Agent, or Firm*—Skjerven, Morrill, MacPherson, Franklin & Friel; Edward C. Kwok

[57] ABSTRACT

A method for selecting a symbol using an M-key keyboard in a personal information device (PID) divides the M keys into a first key group and a second key group. Each symbol to be recognized from the input key-strokes on the keyboard is assigned a unique two-keystroke sequence in which the first key and the second key of that two-keystroke sequence are selected from different key groups. When receiving keystrokes from the keyboard, two-keystroke sequences received from the keyboard are matched to the symbol assignments to derive which symbol is selected. This method is applicable not only for selecting letters from a European alphabet, such as the English or the Cyrillic alphabets, this method is applicable to selecting from a phonetic alphabet, such as the Pin-Yin system for Chinese characters and other phonetic systems in the Korean and Japanese languages as well.

9 Claims, 3 Drawing Sheets

KEYBOARD FOR PERSONAL INFORMATION DEVICE

BACKGROUND OF THE INVENTION

1. Field of the Invention

The present invention relates to a keyboard designed to be used with a small handheld personal information device.

2. Discussion of the Related Art

Integrated circuits have enabled the proliferation of handheld miniature computers with powerful storage, processing, and communication capabilities. These computers include what are known as "personal digital assistants", which are used for such applications as information organization, "personal communicators", or other information access applications. Collectively, such devices are popularly known as personal information devices (PIDs). As PIDs continue to be miniaturized for portability reasons, equipping these PIDs with "QWERTY" style keyboards as primary input devices has become impractical. Any attempt to implement a full keyboard on a PID inevitably results in a design with either keys that are arranged too close for comfortable and accurate operation, or a PID housing which is significant larger than desired, or both. For example, many electronic organizers with a full computer keyboard are simply too big to be carried like a pager (e.g. clipped to a belt, or comfortably placed in a shirt pocket.

To provide a small and convenient character input mechanism, two classes of methods have been tried. The first class of methods attempts to eliminate the keyboard altogether, and the second class of methods attempts to encode additional characters on each of a limited number of keys, by adding modifier keys such as control, alternate, special function etc.

The first class of methods includes handwriting and voice recognition techniques. However, handwriting recognition not only requires a powerful processor in the PID, it has proved to be quite unreliable. Voice recognition, an even more computationally intensive technique, has also been tried. Like handwriting recognition, voice recognition is error-prone, even after the user has invested a significant amount of time in training the device. Voice input is also impractical because of lack of privacy and is socially unacceptable in many occasions.

Yet another alternative provides "soft keys". Under the soft key approach, a touch-sensitive screen displays an image of a keyboard and the user is provided a pen or stylus to select the keys from the keyboard image on the screen. At least three problems are associated with the soft key approach. First, data entry in a soft key keyboard is slow because only one character can be selected at a time. Further, tactile feedback and spatial memory, which enable high speed data entry on the QWERTY type keyboard, is not available on a soft key keyboard. Second, the stylus is often misplaced. Third, a touch-sensitive screen increases costs and reduces the reliability of the device.

In addition, it is desired to minimize both power consumption and the physical size of the PID. Power consumption is minimized if the character input operation does not depend on a computationally intensive mechanism, like the voice or handwriting recognition techniques discussed above. By avoiding computationally intensive operations, a longer battery life between charging results.

SUMMARY OF THE INVENTION

The present invention provides a compact easy-to-use M-key keyboard that requires a relatively insignificant amount of power to process the input data. The method divides the M keys of a keyboard, in a personal information device (PID), into a first key group and a second key group. Each symbol to be recognized from the input keystrokes on the keyboard is assigned a unique two-keystroke sequence in which the first key and the second key of that two-keystroke sequence are selected from different key groups. When receiving keystrokes from the keyboard, two-keystroke sequences received from the keyboard are matched to the symbol assignments to determine which symbol is selected. This method is applicable not only for selecting letters from the English alphabet, this method is applicable to selecting Chinese characters, and characters of other languages, as well.

In one embodiment, a keyboard is displayed in a graphical display as an array of display areas having H columns and (M-H) rows, where H is the number of keys in said first key group. In that embodiment, each of the H columns is assigned to a unique key in the first key group, and each of the (M-H) rows is assigned to a unique key in the second key group. Each display area of the array is assigned two symbols, which are the symbols associated with the keys assigned to the column and row positions of the display area. In that embodiment, when the first key of the two-keystroke sequence is received and recognized, the letters in the row or column which have the received key as the first key in their respective assigned two-keystroke sequence are highlighted to provide visual feedback of the possible solutions to the user. A variation of the method allows the user to correct an error due to erroneously inverting the key sequence of the two-keystroke sequence. In that variation, if the same key is pressed again immediately after being received as a first key of a two-keystroke sequence, the repeated key is deemed a correction to make that key a second key of the two-keystroke sequence. The third key pressed is then received as the first key of the two-keystroke sequence. Thus, in that variation, a recovery from an inadvertent reversal of keystrokes is provided.

The present invention is especially applicable to two-way wireless portable electronic messaging devices, such as two-way pagers, palmtop computers and other small portable electronic devices, to which miniaturization is important. Because only a small number of keys are needed to enable selection of a large number of selections, a high percentage of the total surface area of the device's housing can be allocated to provide a relatively large display.

The present invention is better understood upon consideration of the detailed description below and the accompanying drawings.

DETAILED DESCRIPTION OF THE PREFERRED EMBODIMENTS

Figure 1A:
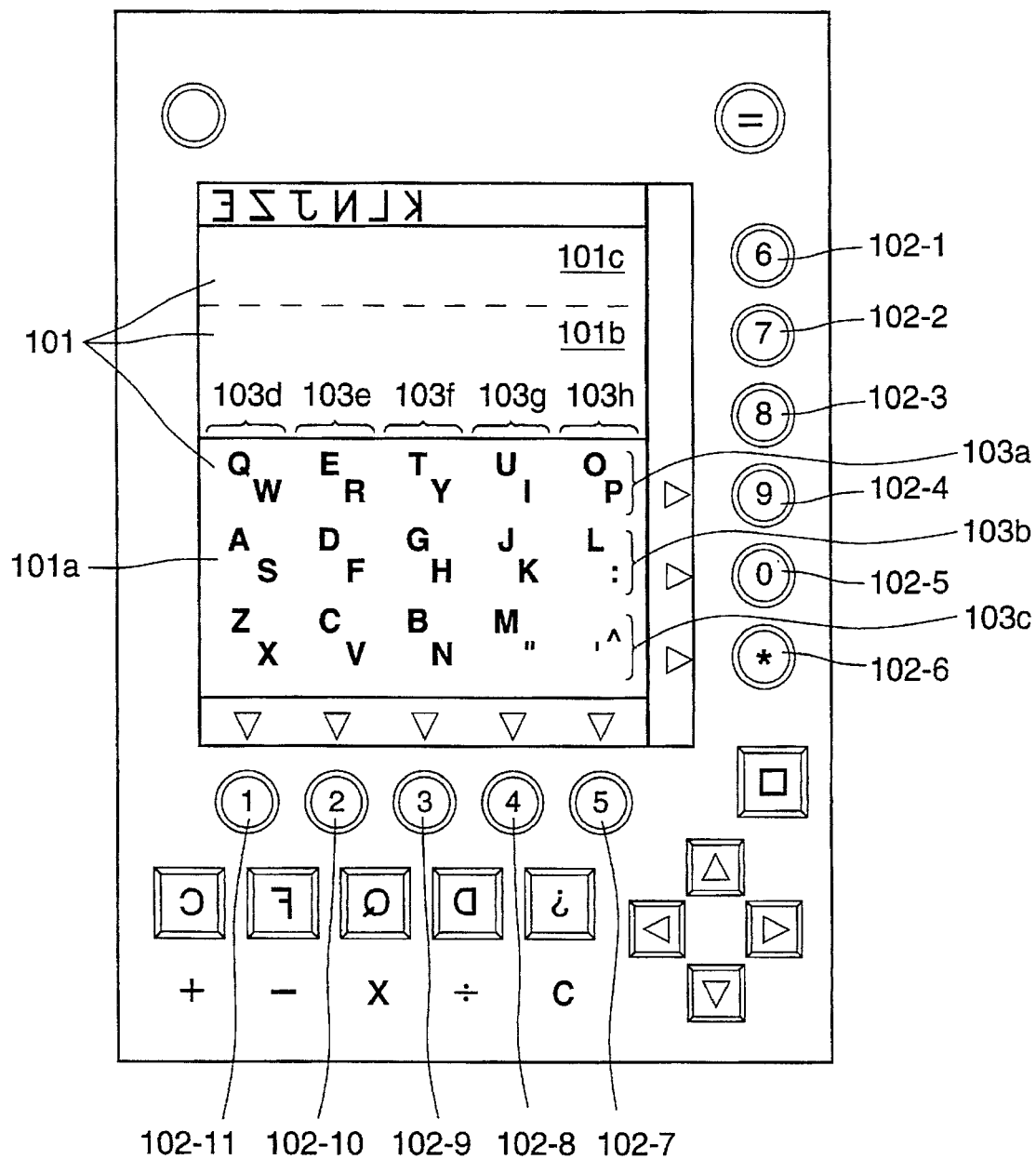
FIG. 1a shows an embodiment of the present invention using a keyboard 100.

The present invention provides the ability to enter up to $$\frac{M^2}{2}$$

different characters, using a keypad with M keys and a simple two-keystrokestroke sequence. The present invention is illustrated by FIG. 1a, which shows a keyboard 100 on a personal information device (PID), such as a pager. Typically, such a PID would include a number of keys for inputting data and control information and a liquid crystal display (LCD) or any suitable type of display. Such a PID is typically controlled by a microprocessor by software typically stored in a non-volatile memory. Such software includes programs for displaying text or graphics on the LCD and software for receiving data input from the keyboard. The know-how for creating software for such a PID is known in the art.

In FIG. 1a, the keys of keyboard 100 are placed on two sides of a rectangular display 101, which includes display areas 101a, 101b and 101c. As shown in FIG. 1a, six keys 102-1 to 102-6 (the "vertical" group) are placed adjacent to the "vertical" side of display 101, and the remaining five keys 102-7 to 102-11 (the "horizontal" group) are placed below the "bottom" side of rectangular display area 101. FIG. 1 shows on rectangular display area 101a six rows of letters in the English alphabet arranged in three horizontal sets 103a, 103b and 103c, with each set having two rows of letters each. The letters displayed on rectangular display 101, in display area 101a, can also be seen as being grouped in 5 vertical sets 103d to 103h of two columns of letters each. The two rows of letters in each horizontal sets are arranged, if the first and second rows are merged vertically, to represent letters in one row of typewriter keys. For example, merging the two rows in set 103a yields the sequence "QWERTYUIOP", which is the traditional key arrangement at the top row of a conventional typewriter keyboard.

Figure 1B:
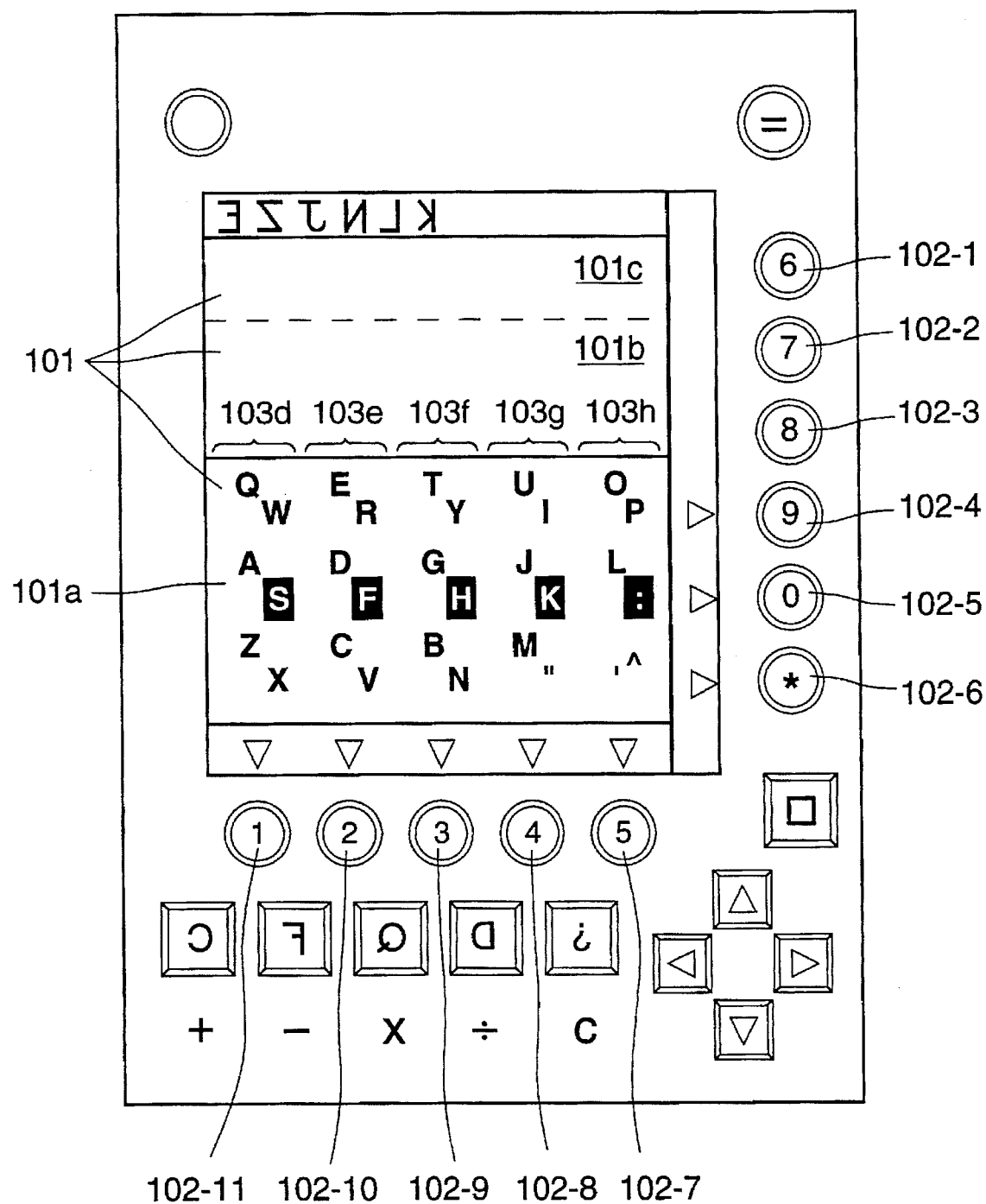
FIG. 1b shows a highlighted row of characters on display area 101 as a result of pressing key 102-5 of keyboard 100.

Keyboard 100 is operated by selecting one key from each of the vertical and horizontal groups of keys. In the present invention, the order in which keys in the vertical group and the horizontal group are pressed is significant. For example, if key 102-5 is pressed, the letters in two-row set 103b are selected, and because key 102-5 of the vertical group is selected as the first key of a two-keystroke sequence, letters of the bottom row of row set 103b (i.e. the letters "S", "F", "H", "K" and ":") are highlighted in this embodiment to indicate the possible selections of two-row set 103b, as shown in FIG. 1b. Then, by selecting a key from the vertical group, the selected letter is uniquely determined. In this example, selecting key 102-10 selects the letter "D".

Figure 1C:
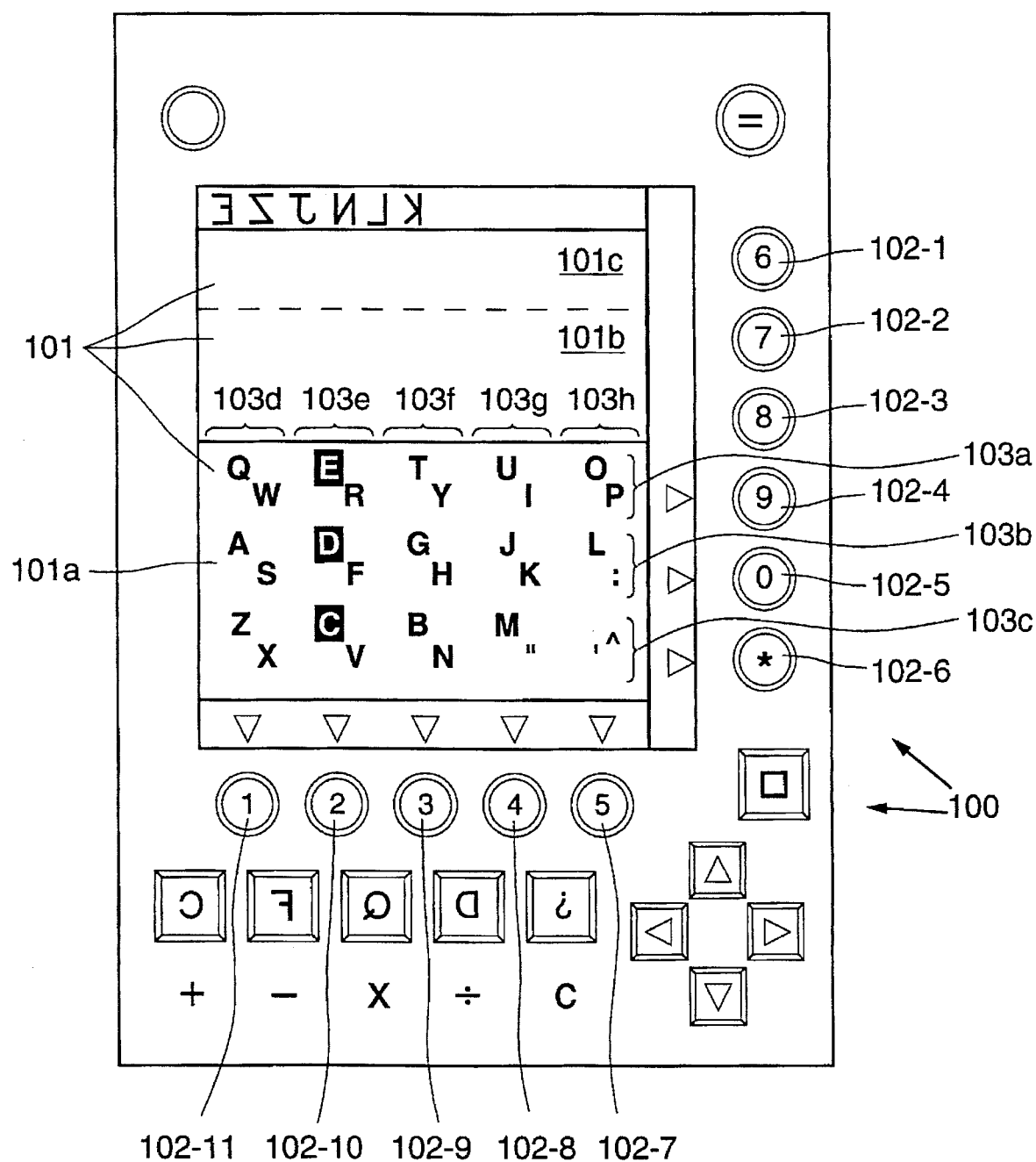
FIG. 1c shows a highlighted column of characters, as a result of pressing key 102-10 of keyboard 100.

Alternatively, if key 102-10 in the horizontal group is first selected, the column set 103e is selected, and since key 102-10 is the first key pressed in a two-keystroke sequence, letters "E", "D" and "C" are highlighted, as shown in FIG. 1c. If key 102-4 of the vertical group is then pressed, the letter "E" is selected.

Providing an input control program that runs on the microprocessor of a PID, and which (i) displays the letters of the alphabet on an LCD display or any suitable display and (ii) decodes input keystrokes from a keyboard, is within the skill of those in the art.

Special characters and punctuations, such as <space>, <shift/change case>, can be simply using an additional key of the vertical group, for example. Referring back to FIG. 1a, display area 101a can be used to display text composed by the method of the present invention. Display area 101b can be used to display the special characters in a two-dimensional rectangular array of two-character elements, as in display area 101a. The method of the present invention can then be applied to select any of these special characters of display area 101b using keys 102-2 and 102-3 of the vertical group and keys 102-7 to 102-11 of the horizontal group.

The present invention is also applicable to selecting Chinese characters using the "Pin-Yin" system, which codes Chinese characters using phonemes from a phonetic alphabet. To select Chinese characters, instead of letters in the English alphabet, display area 101a displays phonemes in place of the English alphabet. Further, in the Pin-Yin system, where the same phoneme codes multiple Chinese characters, the possible candidate characters can be arrayed to allow the two-keystroke selection scheme discussed above. Similarly, the phonetics alphabets of other languages, such as the Korean and Japanese languages, can be similarly provided.

One variation of the method discussed above allows for recovering from choosing erroneously, as the first key of the two-keystroke sequence, a key in the vertical group, when a key in the horizontal group should have been chosen. Referring to FIG. 1a, if the letter "R" is desired, but the user erroneously pressed key 102-10 as his first key, thereby highlighting the left column (i.e. letters "E", "D", "C") of set 103e, recovery can be simply achieved by pressing key 102-10 a second time. When the second time key 102-1 is pressed, the input control program interprets that the right column of the set 103e is desired. The letters "R", "F", and "V" are then highlighted. If key 102-4 is then pressed, the letter "R" is selected. A similar scheme can be implemented for row selection. For example, if key 102-4 is pressed, the letters "W", "R", "Y", "T" and "P" are highlighted. If the user then presses key 102-4 again, the keys "Q", "E", "T", "U" and "O" are then highlighted. Then, pressing key 102-10 selects, for example, the letter "E". In this variation, if one would rather not have to think about whether a key from the column group or a key from the horizontal group should be first pressed, any letter can be selected using either a two-keystroke sequence, or a three-keystroke sequence.

The above detailed description is provided to illustrate the specific embodiments of the present invention and is not intended to be limiting. Numerous variations and modifications within the scope of the present invention are possible. The present invention is defined by the appended claims.

I claim:

1. A method for selecting a symbol from a set of symbols using a keyboard in a personal information device (PID), said PID having a graphical display, said method comprising the steps of:

(i) providing M keys on said keyboard, said M keys being grouped into a first key group and a second key group;

(ii) associating each of said symbols with a two-keystroke sequence, said two-keystroke sequence consisting of a first key and a second key selected from said first and second key groups, said first key and said second key being selected from different key groups, such that no two symbols are assigned the same two-keystroke sequence;

(iii) dividing said graphical display into an array of display areas having H columns and (M-H) rows, where H is the number of keys in said first key group;

(iv) assigning each of said H columns a key in said first key group, such that no two keys in said first key group are assigned the same column;

(v) assigning each of said (M-H) rows a key in said second key group, such that no two keys in said second key group are assigned the same row;

(vi) displaying in each of said display areas two symbols, being symbols associated with the keys assigned to the column and row positions of said display area;

(vii) receiving from said keyboard a two-keystroke sequence; and (viii) matching said two-keystroke sequence received from said keyboard to the symbol associated in said associating step with said two-keystroke sequence.

2. A method as in claim 1, further comprising the steps of:

positioning keys in said first key group adjacent a column of said array of display areas; and positioning keys in said second key group adjacent a row of said array of display areas.

3. A method as in claim 1, wherein said symbols to be selected are letters of an alphabet.

4. A method as in claim 3, wherein said letters are letters of the English alphabet.

5. A method as in claim 1, wherein said symbols to be selected are phonemes for forming letters of a phonetic alphabet.

6. A method as in claim 5, wherein said phonemes are phonemes in the Pin-Yin system of Chinese characters.

7. A method as in claim 1, wherein said step of receiving said two-keystroke sequence comprises the step of highlighting on said graphical display, after receiving the first key of said two-keystroke sequence, all symbols associated with two-keystroke sequences whose first key is said first key received.

8. A method as in claim 7 wherein, during said step of receiving said two-keystroke sequence, if said first key received is immediately received again, said first key received is deemed to be a second key of said two-keystroke sequence, and when a key not of the same key group of said first key received is subsequently received from the keyboard, said second key received is deemed said first key in a two-keystroke sequence.

9. A method as in claim 8 further comprising the step of, upon receiving said first key successively, highlighting all symbols associated with two-keystroke sequences having said first key received as the second key of said two-keystroke sequences.

* * * * *